United States Patent
Baird et al.

(10) Patent No.: US 8,248,688 B2
(45) Date of Patent: Aug. 21, 2012

(54) TANDEM PHOTONIC AMPLIFIER

(75) Inventors: Brian W. Baird, Portland, OR (US);
David M. Hemenway, Beaverton, OR (US); Xiaoyuan Peng, Portland, OR (US); Wensheng Ren, Frederick, MD (US)

(73) Assignee: Electro Scientific Industries, Inc., Portland, OR (US)

( * ) Notice: Subject to any disclaimer, the term of this patent is extended or adjusted under 35 U.S.C. 154(b) by 207 days.

(21) Appl. No.: 12/374,989

(22) PCT Filed: Jul. 25, 2007
(Under 37 CFR 1.47)

(86) PCT No.: PCT/US2007/074340
§ 371 (c)(1),
(2), (4) Date: Nov. 18, 2011

(87) PCT Pub. No.: WO2008/014331
PCT Pub. Date: Jan. 31, 2008

(65) Prior Publication Data
US 2012/0092755 A1   Apr. 19, 2012

Related U.S. Application Data

(60) Provisional application No. 60/834,037, filed on Jul. 27, 2006.

(51) Int. Cl.
*H01S 4/00* (2006.01)
*H04B 10/17* (2006.01)
(52) U.S. Cl. ............... 359/333; 359/337.2; 359/341.1; 372/6; 372/25

(58) Field of Classification Search ........... 359/337.2, 359/341.1; 372/6, 25
See application file for complete search history.

(56) References Cited

U.S. PATENT DOCUMENTS

| | | | |
|---|---|---|---|
| 7,126,746 B2 | 10/2006 | Sun et al. | |
| 2003/0202547 A1* | 10/2003 | Fermann et al. | 372/6 |
| 2004/0134894 A1 | 7/2004 | Gu et al. | |
| 2005/0041976 A1 | 2/2005 | Sun et al. | |
| 2005/0067388 A1 | 3/2005 | Sun et al. | |
| 2007/0140634 A1 | 6/2007 | Windeler et al. | |

OTHER PUBLICATIONS

International Searching Authority (US) Written Opinion, International Patent No. PCT/US2007/074340, Mailed Aug. 25, 2008, 6 Pgs.

* cited by examiner

*Primary Examiner* — Eric Bolda
(74) *Attorney, Agent, or Firm* — Stoel Rives LLP (57) ABSTRACT

Embodiments of laser systems advantageously use pulsed optical fiber-based laser source (12) output, the temporal pulse profile of which may be programmed to assume a range of pulse shapes. Pulsed fiber lasers are subject to peak power limits to prevent an onset of undesirable nonlinear effects; therefore, the laser output power of these devices is subsequently amplified in a diode-pumped solid state photonic power amplifier (DPSS-PA) (16). The DPSS PA provides for amplification of the desirable low peak power output of a pulsed fiber master oscillator power amplifier (14) to much higher peak power levels and thereby also effectively increases the available energy per pulse at a specified pulse repetition frequency. The combination of the pulsed fiber master oscillator power amplifier and the diode-pumped solid state power amplifier is referred to as a tandem solid state photonic amplifier (10).

34 Claims, 11 Drawing Sheets

Pulse Shape Modification "A"

$t_1$ = risetime, $t_r$
$t_2 - t_1$ = spike time, $t_s$
$t_3 - t_2$ = 'plateau' time, $t_p$
$t_4 - t_3$ = fall time, $t_f$
P1 = max amplitude
P2 = first plateau amplitude
P1, P2 adjustable

FIG. 7A

Pulse Shape Modification "B"

$t_1$ = risetime, $t_r$
$t_2 - t_1$ = first 'plateau' time, $t_{p1}$
$t_3 - t_2$ = spike time, $t_s$
$t_4 - t_3$ = second 'plateau' time, $t_{p2}$
$t_5 - t_4$ = fall time, $t_f$
P1 = max amplitude
P2 = first plateau amplitude
P3 = second plateau amplitude
P1, P2, P3 adjustable

FIG. 7B

TANDEM PHOTONIC AMPLIFIER

RELATED APPLICATIONS

This application is a 371 of International Application No. PCT/US2007/074340, filed Jul. 25, 2007, which claims benefit of U.S. Provisional Patent Application No. 60/834,037, filed Jul. 27, 2006.

TECHNICAL FIELD

The present disclosure relates to laser processing systems and, in particular, to laser processing systems having capability to process increasing numbers of target structures for unit time.

BACKGROUND INFORMATION

Q-switched diode-pumped solid state lasers are widely used in laser processing systems. Laser processing systems employed for single pulse processing of dynamic random access memory (DRAM) and similar devices commonly use a Q-switched diode-pumped solid state laser. In this important industrial application, a single laser pulse is commonly employed to sever a conductive link structure. In another important industrial application, Q-switched diode-pumped solid state lasers are employed to trim resistance values of discrete and embedded components.

As demand continues for laser processing systems with the capability to process increasing numbers of link structures for each unit time, alternative laser technologies and alternative laser processing system architectures will be needed. U.S. Patent Application Pub. No. US-2005-0067388, which is assigned to the assignee of this patent application, describes one such laser technology in which laser processing of conductive links on memory chips or other integrated circuit (IC) chips is accomplished by laser systems and methods employing laser pulses of specially tailored intensity profile for better processing quality and yield.

U.S. Patent Application Pub. No. US-2005-0041976, which is assigned to the assignee of this patent application, describes a method of employing a laser processing system that is capable of using multiple laser pulse temporal profiles to process semiconductor workpiece structures on one or more semiconductor wafers.

SUMMARY OF THE DISCLOSURE

Embodiments of laser systems described herein advantageously use pulsed optical fiber-based laser source output, the temporal pulse profile of which may be programmed to assume a range of pulse shapes. These laser systems implement methods of selecting the pulse shape when a laser beam is directed to emit a pulse toward a specific workpiece structure. Pulsed fiber lasers are subject to peak power limits in order to prevent an onset of undesirable nonlinear effects, such as stimulated Brillouin scattering and spectral broadening. The effective peak power limit varies as a function of the fiber type and design employed and the sensitivity to various parameters, such as spectral bandwidth and spatial mode quality. The effective peak power prior to the onset of undesirable effects is typically between about 500 W and about 5 KW.

To take advantage of the useful characteristics of pulsed fiber master oscillator power amplifiers (MOPA) and achieve high peak power output, the laser output power of these devices is subsequently amplified in a diode-pumped solid state photonic power amplifier (DPSS-PA). The DPSS-PA design provides for amplification of the desirable low peak power output of a pulsed fiber MOPA to much higher peak power levels and thereby also effectively increases the available energy per pulse at a specified pulse repetition frequency. The combination of the pulsed fiber MOPA source and the DPSS-PA is referred to as a tandem solid state photonic amplifier.

Use of a diode-pumped solid state amplifier to amplify the laser output power of a pulsed fiber MOPA enables achievement of higher peak power than the peak power reproducible directly by a pulsed fiber MOPA without output degradation resulting from nonlinear effects. Moreover, use of a diode-pumped solid state laser achieves producing higher peak power and higher energy per pulse at the operating pulse repetition frequency while substantially maintaining useful pulse output characteristics generated by the pulsed fiber MOPA. Such useful characteristics include pulse shape, pulse width, pulse amplitude stability, and narrow spectral bandwidth.

Additional aspects and advantages will be apparent from the following detailed description of preferred embodiments, which proceeds with reference to the accompanying drawings.

DETAILED DESCRIPTION OF PREFERRED EMBODIMENTS

Figure 1:
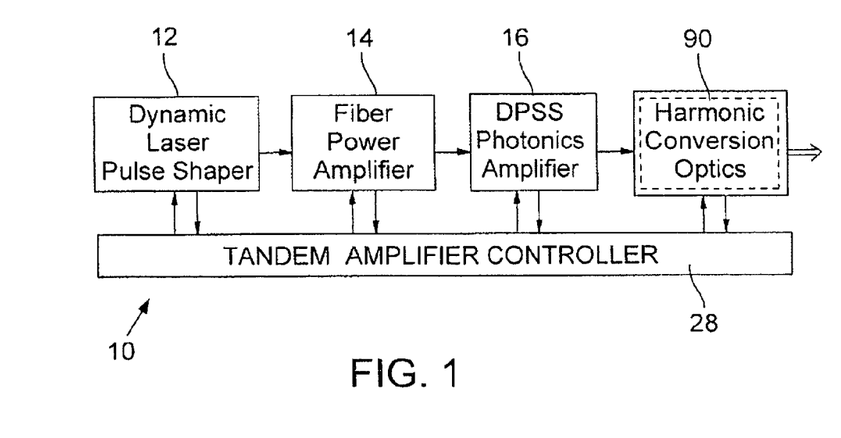
FIG. 1 is a block diagram of a preferred arrangement of optical elements of a tandem photonic amplifier.

FIG. 1 depicts in block diagram form a preferred arrangement of optical elements of a tandem photonic amplifier 10. Tandem photonic amplifier 10 includes a dynamic laser pulse shaper (DLPS) 12, the output of which is optically coupled into and amplified by a fiber power amplifier (FPA) 14. The output of FPA 14 is coupled into and amplified by a diode-pumped solid state photonics amplifier 16. DLPS 12, FPA 14, or both, incorporate frequency selecting elements, such as Bragg fiber gratings or frequency stabilized seed oscillators, that may be selected or adjusted to produce from FPA 14 spectral output that effectively couples to the emission wavelength of diode-pumped solid state amplifier 16.

Figure 2:
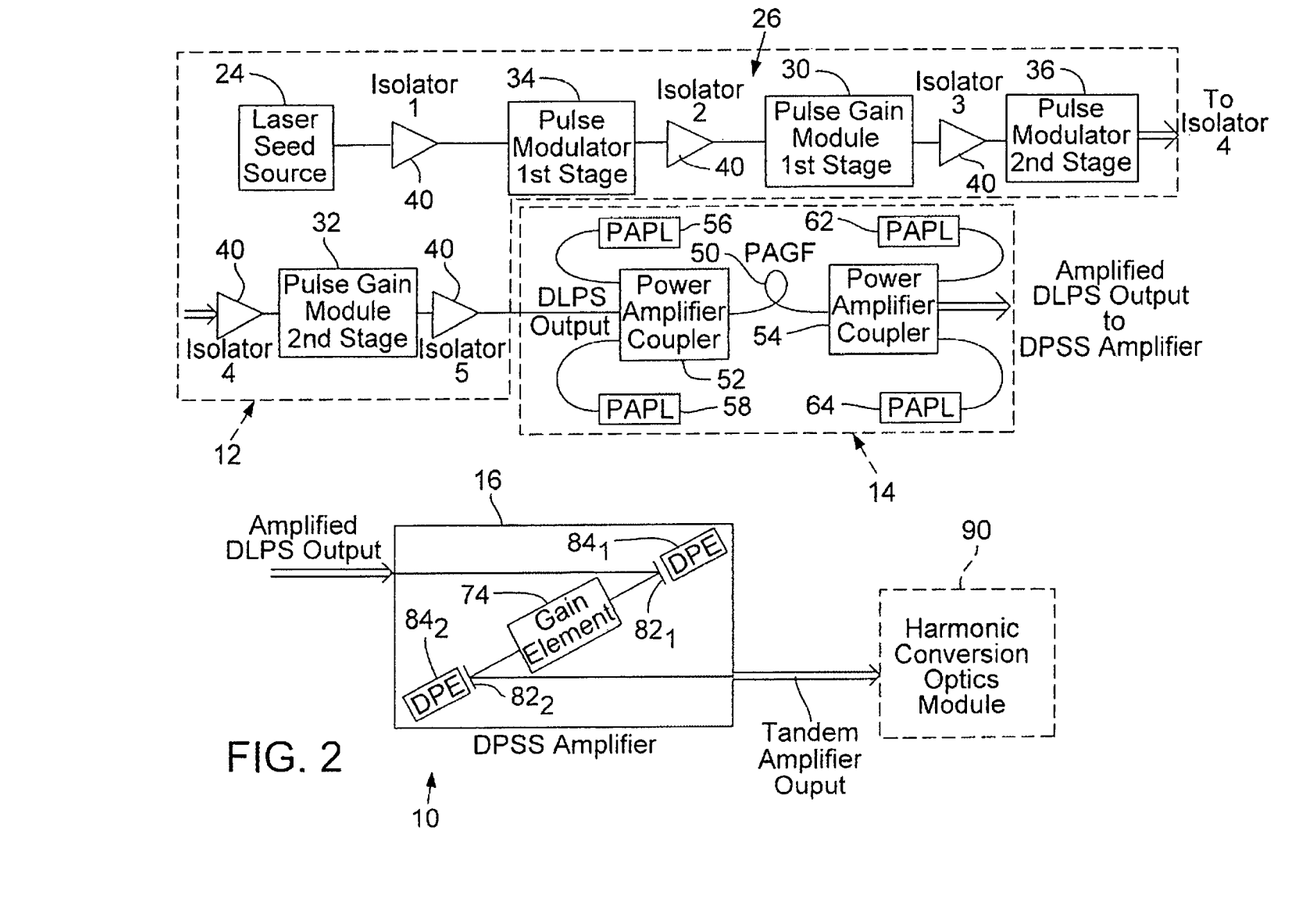
FIG. 2 shows in greater detail the optical elements of the tandem photonic amplifier of FIG. 1.

FIG. 2 shows in greater detail preferred embodiments of the optical elements of tandem photonic amplifier 10. In a preferred embodiment of DLPS 12, a laser injection source 24, including a seed diode, emits continuous-wave (cw) output that is modulated by an optical modulator 26 to produce a suitable first laser pulse profile as commanded by a tandem amplifier controller 28 (FIG. 1). Laser seed source 24 is selected such that its center wavelength and spectral bandwidth effectively couple to the gain spectra of pulse gain modules 30 and 32 and the gain spectrum of diode-pumped solid state amplifier 16. Alternatively, laser injection source 24 may be a pulsed output produced by, for example, a pulsed semiconductor laser or a Q-switched solid state laser. Optical modulator 26 may include an electro-optic modulator, an acousto-optic modulator, or another suitable type of optical modulator. Optical modulator 26 is composed of one or more modulator-amplifier stages for the purpose of generating the first laser pulse profile. FIG. 2 shows a series-arranged first modulator-amplifier stage including a pulse modulator 34 and pulse gain module 30 positioned in cascade relationship with a series-arranged second modulator-amplifier stage including a pulse modulator 36 and pulse gain module 32. The first and second modulator-amplifier stages cooperate to generate a tailored pulse output at a first energy per pulse and a first pulse peak power with a first output tailored pulse shape temporal profile at a first center wavelength. Standard optical isolators 40, which may be fiber coupled or bulk optical isolators, are positioned at the inputs and outputs of the components of the first and second stages to prevent feedback of light propagating in the optical component train. The tailored laser pulse output produced is suitable for amplification. In an alternative embodiment, a single pulse modulator 30 and a single pulse gain module 32 may be employed together with intervening optical isolators 40 to produce a tailored laser pulse output that is suitable for amplification.

Tandem amplifier controller 28 can be programmed with a matrix of command signals for delivery to pulse modulators 34 and 36 to produce a range of laser pulse profiles, which when applied to pulse gain modules 30 and 32, result in the production of transformed laser pulse profiles desired as output from DLPS 12.

In the preferred embodiment shown in FIG. 2, the transformed pulse output from DLPS 12 is injected into a modular fiber power amplifier (FPA) 14. FPA module 14 incorporates power amplifier couplers that allow injection of the output from DLPS 12 and outputs from power amplifier pump lasers into a power amplifier gain fiber. As is well known to persons skilled in the art, power amplifier couplers may be placed at either end or both ends of the fiber. Multiple additional power amplifier couplers may be spliced into the length of the fiber, as required.

More specifically, FIG. 2 shows modular FPA 14 composed of a power amplifier gain fiber (PAGF) 50 with its input and output ends placed between power amplifier couplers (PACs) 52 and 54, respectively. The output of DLPS 12 and the outputs of power amplifier pump lasers (PAPLs) 56 and 58 are applied to separate inputs of PAC 52. The output end of PAGF 50 and the outputs of PAPLs 62 and 64 are applied to separate inputs of PAC 54. An amplified DLPS output suitable for delivery to a modular diode-pumped solid state photonic power amplifier (DPSS-PA) 16 propagates from an output of PAC 54, which constitutes the output of FPA module 14. Diode-pumped FPA module 14 generates a tailored pulse output at a second energy per pulse and second pulse peak power with a second output tailored pulse shape temporal profile that is substantially the same as the input tailored pulse shape temporal profile at a first center wavelength.

PAGF 50 is preferably a single-mode polarization preserving fiber and may incorporate frequency selecting structures. A first embodiment of PAGF 50 is a waveguide device with silica fiber core doped with rare earth ions and clad with one or more concentric sheaths of optical material. A second embodiment of PAGF 50 contains concentric cladding sheathes that have regions doped with rare earth ions. A third embodiment of PAGF 50 is a photonic crystal fiber (PCF), in which the cladding sheath or sheathes contain a highly periodic distribution of air holes. In an alternative embodiment, PAGF 50 is a multi-mode fiber. Skilled persons will appreciate that the number of PAPLs used is determined by the type and length of the PAGF 50 employed and the desired characteristics of the optical pulse output from FPA module 14. Output from PAGF 50 is collimated and polarized, as required, by terminal optics.

Output from FPA module 14 is coupled into a modular DPSS-PA 16. Beam conditioning elements are employed, as required, to produce the correct polarization and beam propagation parameters for delivery to a DPSS-PA gain element 72. An optical isolator 40 may be employed (but is not shown) at the output of FPA module 14 and at the input to modular DPSS-PA 16. DPSS-PA gain element 72 is preferably a solid state lasant. As an illustrative example, for 1064 nm output from PAGF 50, DPSS-PA gain element 72 may be preferably selected from a variety of well-known to the art Nd-doped solid state lasants, most preferably Nd:YVO4 or Nd:YAG.

FIGS. 3A, 3B, 3C, 3D, 3E, and 3F show alternative gain element-optical pumping configurations of DPSS-PA 16. (The different embodiments of DPSS-PA 16 are identified by reference numeral 16, followed by the lower case letter suffix of its corresponding drawing figure.)

Figure 3A:
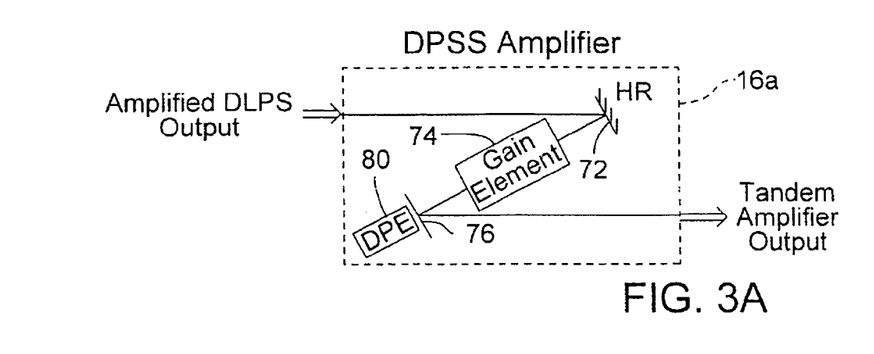
FIGS. 3A, 3B, 3C, 3D, 3E, and 3F show alternative gain element-optical pumping configurations for the diode-pumped solid state power amplifier included in the tandem photonic amplifier of FIG. 2.

In FIG. 3A, the output propagating from FPA module 14 reflects off a highly reflective mirror 72 into a gain element 74 of a DPSS-PA 16a. Gain element 74 is end-pumped through a dichroic optical element 76 by a diode pump element 80. Pulsed light propagating from gain element 74 reflects off dichroic optical element 76 and exits DPSS-PA 16a as the tandem amplifier output.

Figure 3B:
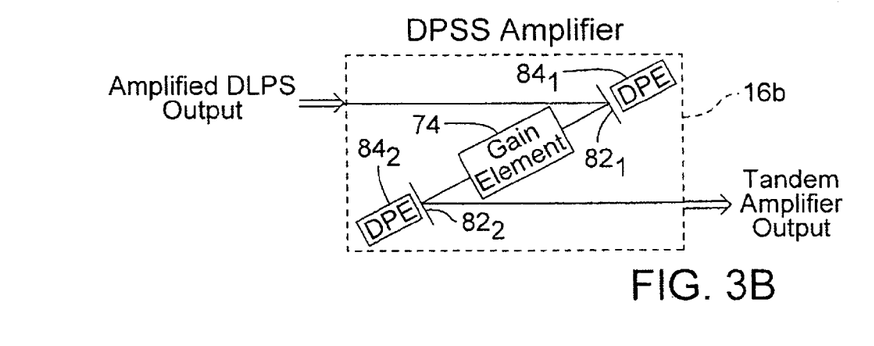

In FIG. 3B, the output propagating from FPA module 14 reflects off a dichroic optical element $82_1$ and into gain element 74 of a DPSS-PA 16b. Gain element 74 is end-pumped through dichroic optical elements $82_1$ and $82_2$ by their respective associated diode pump elements $84_1$ and $84_2$. (The optical pumping components of this embodiment are also shown in FIG. 2.) Pulsed light propagating from gain element 74 reflects off dichroic optical element $82_2$ and exits DPSS-PA 16b as the tandem amplifier output.

Figure 3C:
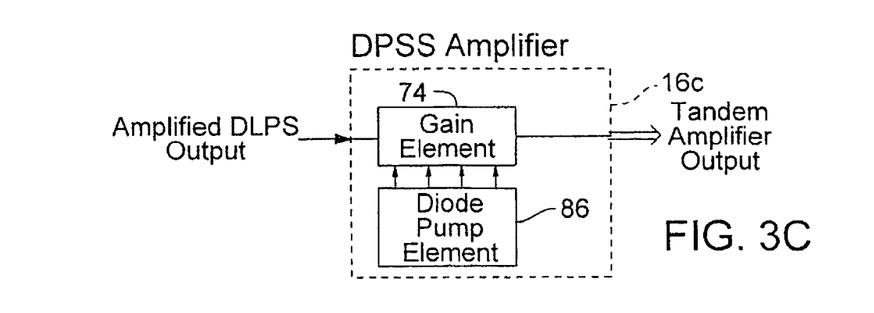

In FIG. 3C, the output propagating from FPA module 14 enters gain element 74 of a DPSS-PA 16c. Gain element 74 is side-pumped by a diode pump element 86. Pulsed light propagating from gain element 74 exits DPSS-PA 16c as the tandem amplifier output.

Figure 3D:
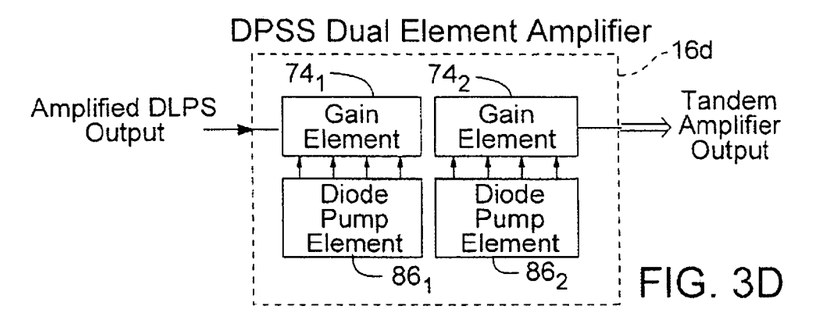

In FIG. 3D, a first alternative to the embodiment of DPSS-PA 16c is implemented with series-arranged gain elements 74$_1$ and 74$_2$ side-pumped by respective diode pump elements 86$_1$ and 86$_2$ to form a DPSS-PA 16d. Pulsed light propagating from gain element 74$_2$ exits DPSS-PA 16d as a tandem amplifier output.

Figure 3E:
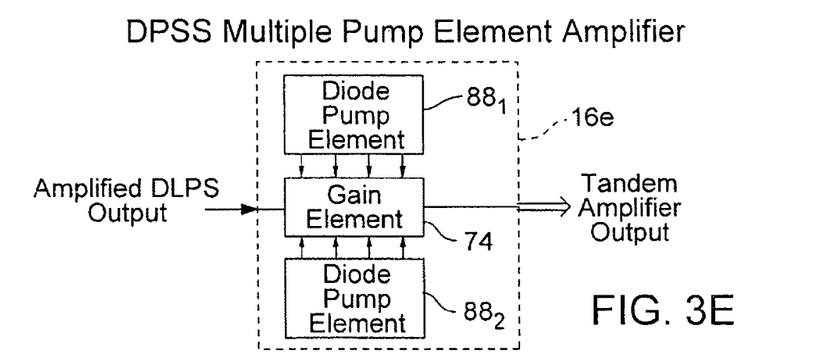

In FIG. 3E, a second alternative to the embodiment of DPSS-PA 16c is implemented with gain element 74 pumped on opposite sides by diode pump elements 88$_1$ and 88$_2$ to form a DPSS-PA 16e. Pulsed light propagating from gain element 74 exits DPSS-PA 16e as the tandem amplifier output.

Figure 3F:
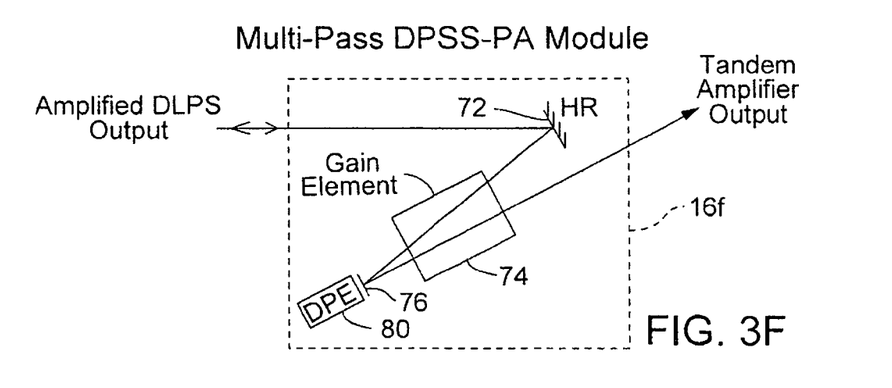

In FIG. 3F, the output propagating from FPA module 14 reflects off highly reflective mirror 72 into gain element 74 of a DPSS-PA 16f at an angle selected such that the pulsed light propagating through gain element 74 strikes dichroic optical element 76 and makes a second pass through gain element 74. Gain element 74 is end-pumped through dichroic optical element 76 by diode pump element 80. Double-passed pulsed light propagating from gain element 74 then exits DPSS-PA 16f as the tandem amplifier output.

Skilled persons will recognize that, by suitable arrangements of reflecting elements and selection of gain element dimensions, additional multi-pass embodiments can be implemented. Additional multi-pass embodiments would include those implemented with side pumping (such as is shown in FIGS. 3C-3E) and multiple gain elements (such as shown in FIG. 3D). Each of the embodiments of DPSS-PA 16a, 16b, 16c, 16d, 16e, and 16f contains a solid state gain medium, which may be a rod, cylinder, disk, or rectangular parallelepiped, and generates tailored pulse output at a third energy per pulse and third pulse peak power with a third output tailored pulse shape temporal profile that is substantially equivalent to the input tailored pulse shape temporal profile at a first center wavelength.

FIG. 2 shows, as an option, the output of tandem amplifier 10 coupled into a harmonic conversion optics module 90, which is depicted in dashed lines. Harmonic conversion optics module 90 incorporates nonlinear crystals for the conversion of an incident input pulse to a higher harmonic frequency through well-known harmonic conversion techniques. In a first embodiment implementing harmonic conversion of 1064 nm output from FPA module 14 to 355 nm, harmonic conversion optics module 90 incorporates Type II non-critically phase-matched lithium triborate (LBO) crystal for second harmonic generation (SHG) conversion followed by a Type I critically phase-matched lithium triborate for third harmonic generation (THG) conversion. In a second embodiment implementing harmonic conversion to 266 nm, the THG LBO crystal may be replaced by a critically phase-matched beta-barium borate (BBO) crystal. In a third embodiment implementing fourth harmonic generation (FHG) conversion to 266 nm, CLBO may be alternatively employed. In a fourth embodiment, SHG (532 nm) and THG (355 nm) outputs are subsequently mixed in a deep UV nonlinear crystal, which may be beta-barium borate (BBO), to produce fifth harmonic output at 213 nm.

Harmonic conversion module 90 generates tailored pulse output at a fourth energy per pulse and fourth pulse peak power with a fourth output tailored pulse shape temporal profile that corresponds to the pertinent features of the input tailored pulse shape temporal profile at a second center wavelength.

In a preferred implementation of tandem photonic amplifier 10 of FIG. 2, DLPS 12 includes a frequency-stabilized semiconductor laser seed source 24 that most preferably emits at a center wavelength of 1064.4 nm, has center wavelength tolerance of ±0.2 nm, and has a spectral bandwidth of <0.3 nm, so that the output of DLPS 12 is spectrally well-matched to a Yb-doped PAGF 50 and subsequently to DPSS-PA 16. Those skilled in the art will recognize that such precise spectral matching is not required for efficient operation of FPA module 14 but does enable efficient operation of the integrated tandem amplifier containing DPSS-PA 16. In a preferred embodiment, DLPS 12 and FPA module 14 are components of a tailored pulse master oscillator fiber power amplifier, an example of which is described in U.S. Patent Application Pub. No. US2006/0159138 of Deladurantaye et al. In one numerical example, about 0.6 W at 100 KHz of amplified DLPS output is spectrally well-matched to DPSS gain element 74, which is preferably 0.3% doped Nd:YVO$_4$. In a preferred embodiment of DPSS-PA 16, gain element 74 has dimensions of 3 mm×3 mm×15 mm and is pumped by a single DPE element 84$_1$. Single DPE element 84$_1$ couples about 30 W of 808 nm semiconductor diode laser pump power into gain element 74. Amplified DLPS output produces an approximate 500 µm beam waist diameter in gain element 74. In this example, about 6 W at 100 KHz of 1064.4 nm tandem amplifier output is produced. Exemplary pulse amplitude profile 90$_{IR}$ of 1064.4 nm output of tandem photonic amplifier 10 is shown in FIG. 3G.

Subsequent coupling of tandem amplifier output into harmonic conversion optics module 90 containing a 4 mm×4 mm×20 mm Type I non-critically phase-matched LBO crystal operated at approximately 150° C. and a critically phase-matched Type II LBO crystal operating at about 30° C., in which the beam waists in both crystals is about 50 µm, produces 3 W of 532 nm output and about 0.5 W of 355 nm output. Temporal profiles of the harmonic tandem amplifier output are shown in FIG. 3G.

Figure 3G:
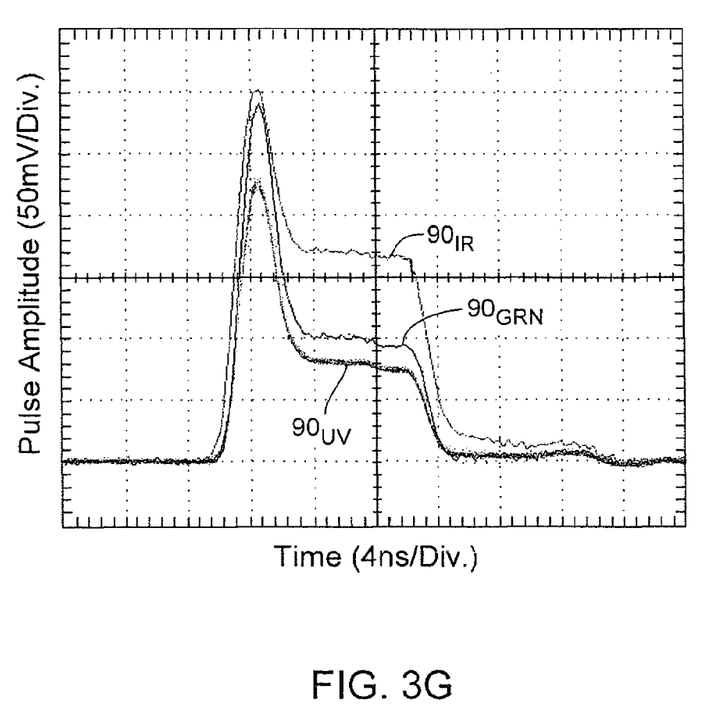
FIG. 3G is a set of oscilloscope traces representing, as examples of outputs of the harmonic conversion module of FIG. 2, chair-shaped tailored pulse shape temporal profiles of infrared, green, and ultraviolet light wavelengths.

FIG. 3G presents, as examples of outputs of harmonic conversion module 90, chair-shaped tailored pulse shape temporal profiles 90$_{IR}$, 90$_{GRN}$, and 90$_{UV}$ for, respectively, infrared (1064.4 nm), green (532 nm), and ultraviolet (355 nm) light wavelengths. FIG. 3G shows that the overall heights (i.e., power levels), of the "chair backs" and "chair seats" are lower at shorter wavelengths and that the pertinent features of the chair-shaped profile are present for each light wavelength. These three temporal profiles are deemed to be substantially faithful replications of the input tailored pulse shape temporal profile. Skilled persons will appreciate that harmonic conversion module 90 may create intermediate harmonic wavelengths, e.g., IR wavelength→green wavelength→UV output wavelength, so that the term "second wavelength" would refer to UV wavelength in this context. Elements of harmonic conversion optics module 90 may be placed into temperature-controlled mounts, the temperature of which is set and controlled by tandem amplifier controller 28 using one or both of active and passive feedback loops so as to precisely control phase-matching temperatures.

Figure 4A:
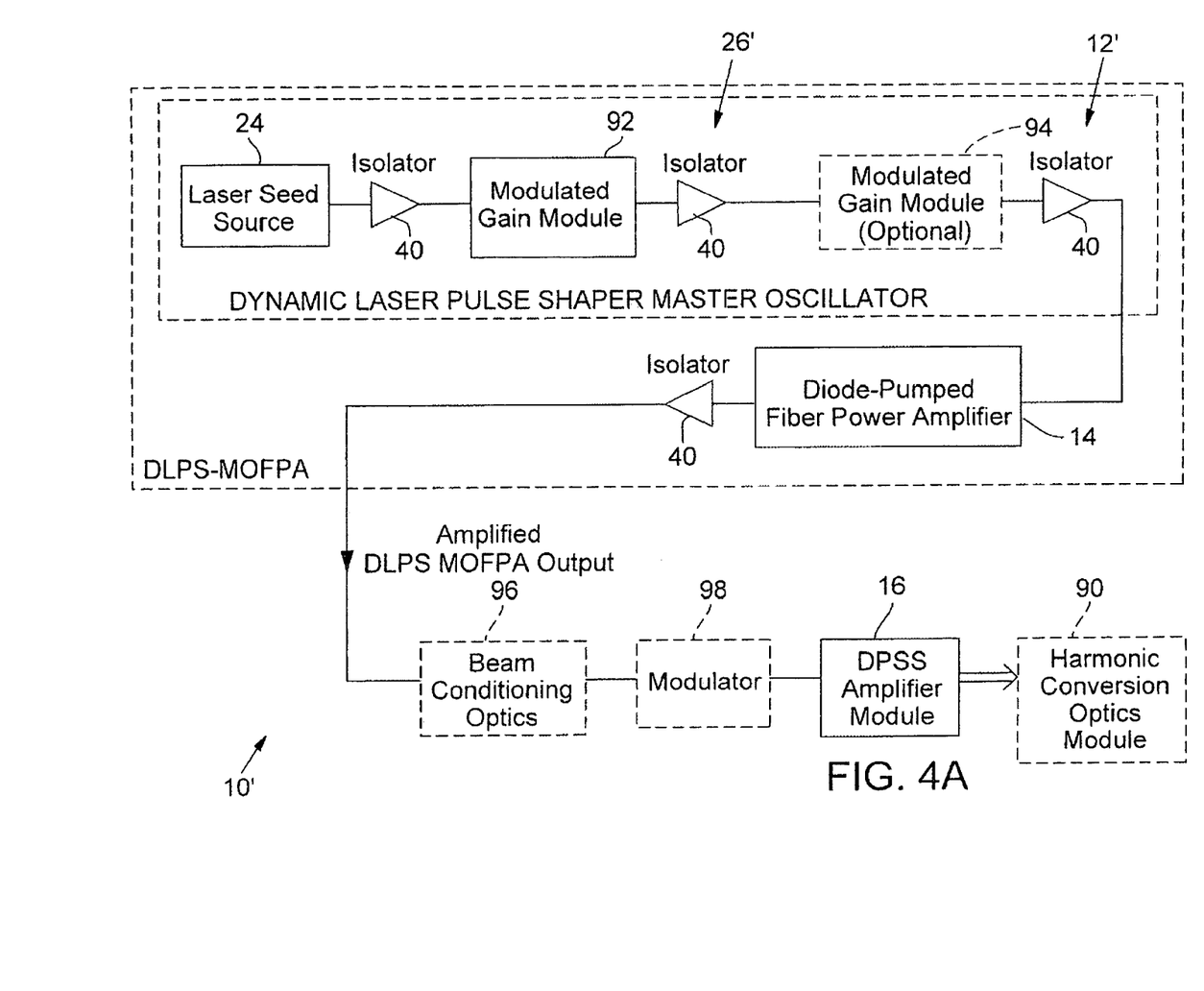
FIG. 4A shows as an alternative embodiment a tandem photonic amplifier in which certain of the optical elements used are different from and are in addition to those used in the tandem photonic amplifier of FIG. 2.

FIG. 4A shows as an alternative embodiment a tandem photonic amplifier 10' in which certain of the optical elements used are different from and are in addition to those used in tandem photonic amplifier 10 shown in FIG. 2. FIG. 4A shows a DLPS 12' configured with a first modulated gain module stage 92 positioned in cascade relationship with an optional, second modulated gain module stage 94. First modulated gain module stage 92 includes a pulse modulator and a pulse gain module corresponding to, respectively, pulse modulator 34 and pulse gain module 30 of FIG. 2; and second modulated gain module stage 94 includes a pulse modulator and a pulse gain module corresponding to, respectively, pulse modulator 36 and pulse gain module 32 of FIG. 2. An alternative implementation uses a single modulated gain module 92, together with intervening optical isolators 40, to produce a tailored laser pulse output that is suitable for amplification. As in the case of DLPS 12 of FIG. 2, tandem amplifier controller 28 can be programmed with a matrix of command signals for delivery to the pulse modulators of modulated gain module stages 92 and 94 to produce a range of laser pulse profiles, which when applied to modulated gain module stages 92 and 94, result in the production of transformed laser pulse profiles desired as output from DLPS 12'.

FIG. 4A also shows that output from FPA module 14 is coupled into beam conditioning optics 96 to produce required beam attributes for efficient delivery to a modulator 98. Modulator 98 is preferably of an acousto-optic type but may also be of an electro-optic type. Output from modulator 98 is coupled into DPSS-PA 16, which amplifies the tailored laser pulse output as described above.

Figure 4B:
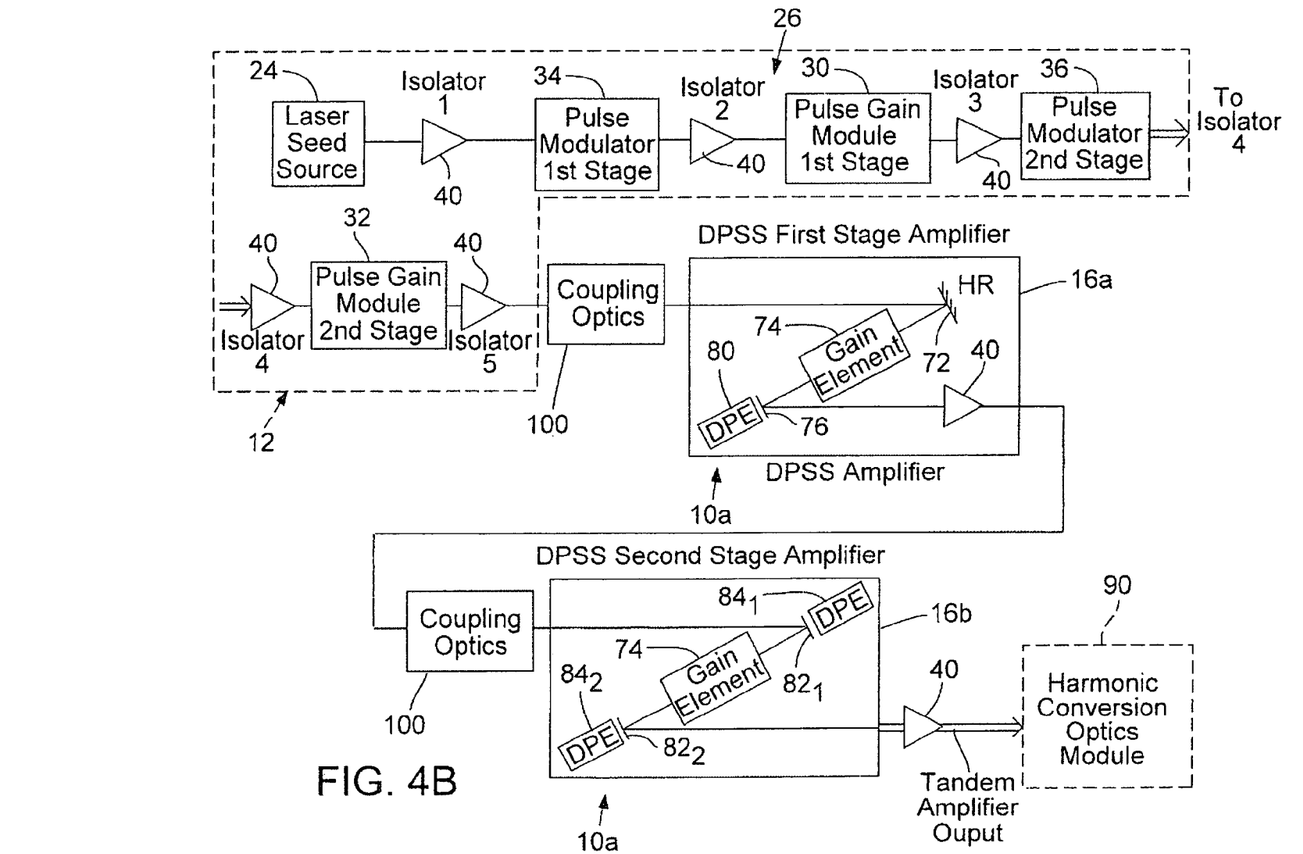
FIG. 4B shows as an alternative embodiment a tandem photonic amplifier that employs the dynamic laser pulse shaper (DLPS) stage of FIG. 2 and diode-pumped solid state (DPSS) amplifier stages of FIGS. 3A and 3B.

FIG. 4B shows as an alternative embodiment a tandem photonic amplifier 10a, in which DPSS amplifier 16a shown in FIG. 3A is substituted for FPA 14 used in tandem photonic amplifier 10 shown in FIG. 2. This substitution results in a tandem photonic amplifier that employs DLPS master oscillator and multiple DPSS amplifier stages, in which DPSS amplifiers 16a and 16 are, respectively, first and second stage DPSS amplifiers. First stage DPSS amplifier 16a typically produces a signal gain of about 30. Optional optical isolators 40 are positioned at the outputs of DPSS amplifiers 16a and 16b, and coupling optics devices 100 are positioned at the inputs of DPSS amplifiers 16a and 16b to focus input light into their gain elements.

Figures 5A, 6:
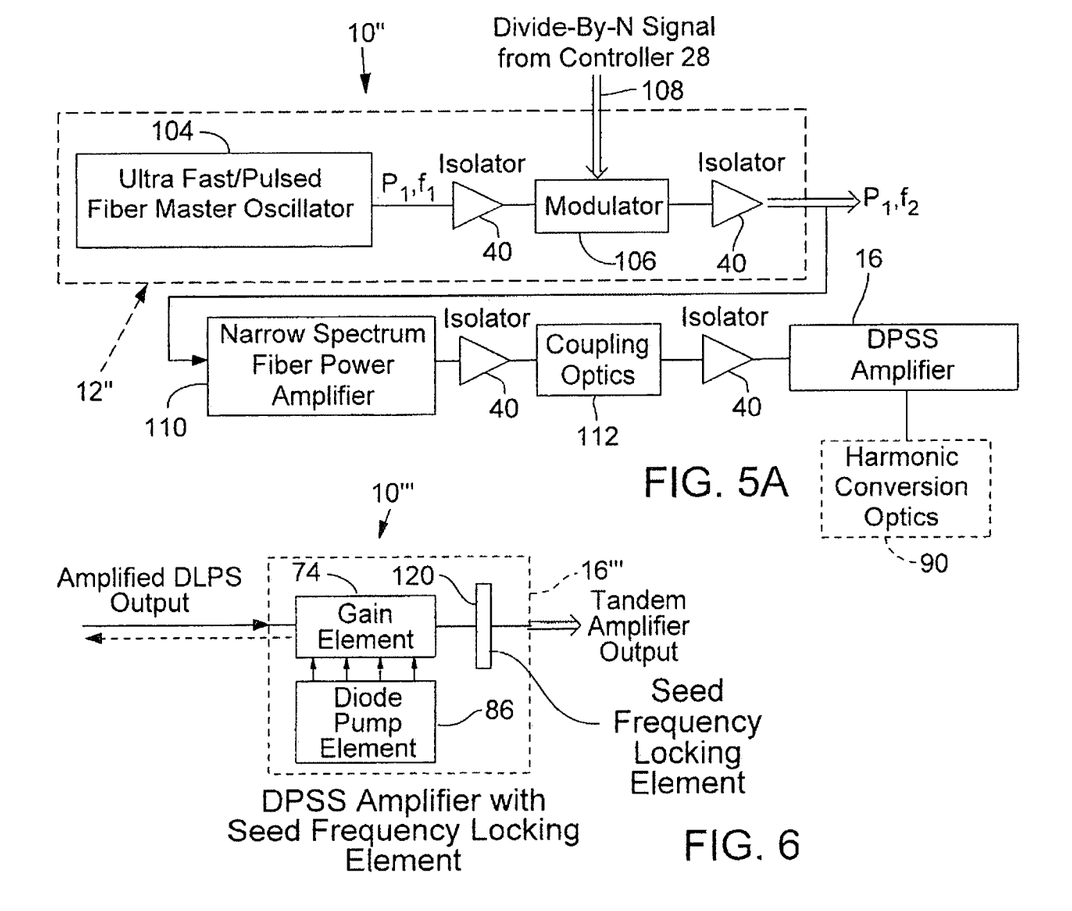
FIG. 5A shows an alternative embodiment of the dynamic laser pulse shaper of FIG. 1.
FIG. 6 shows a pulsed fiber output applied to a diode-pumped solid state power amplifier that incorporates frequency selecting elements to produce desirable spectral output characteristics.

FIG. 5A shows a tandem photonic amplifier 10" constructed with a dynamic laser pulse shaper 12", which is an alternative embodiment of dynamic laser pulse shaper 12. Specifically, FIG. 5A shows dynamic laser pulse shaper 12" implemented with an ultrafast pulsed fiber laser master oscillator 104 that emits pulses at a pulse width of less than 500 ps but greater than 1 fs at a wavelength less than 2.2 μm but greater than 100 nm. Pulsed fiber master oscillator 104 emits output at a first power, $P_1$, and a first frequency, $f_1$, for delivery to a modulator 106 that is positioned between two optical isolators 40. A control signal 108 delivered by tandem amplifier controller 28 to modulator 106 produces for laser pulse shaper 12" laser output at a second power $P_1$", and a second, lower frequency, $f_2$. The output of laser pulse shaper 12" is applied to a narrow spectrum power amplifier 110.

Pulsed fiber master oscillator 104 and narrow spectrum fiber power amplifier 110 preferably incorporate frequency selecting elements to produce a narrow spectral bandwidth and a desirable center wavelength suitable for subsequent amplification by DPSS-PA 16. Such frequency selecting elements may include Bragg fiber gratings or frequency stabilized seed oscillators. As shown in FIG. 5A, tandem amplifier controller 28 may issue control signal 108 to modulator 106 to divide down the higher frequency, $f_1$, master oscillator output to a lower frequency, $f_2$, that is more useful for efficient amplification. An exemplary range of $f_1$ is 20 MHz to 200 MHz, and an exemplary range of $f_2$ is 10 KHz to 20 MHz. Skilled persons will recognize that the relationship between $f_1$ and $f_2$ is given as $f_2=f_1/n$, where n is an integer value. The output of narrow spectrum fiber power amplifier 110 is delivered through a coupling optics module 112, which is positioned between optical isolators 40, to DPSS-PA 16 and optional harmonic conversion optics module 90.

Figure 5B:
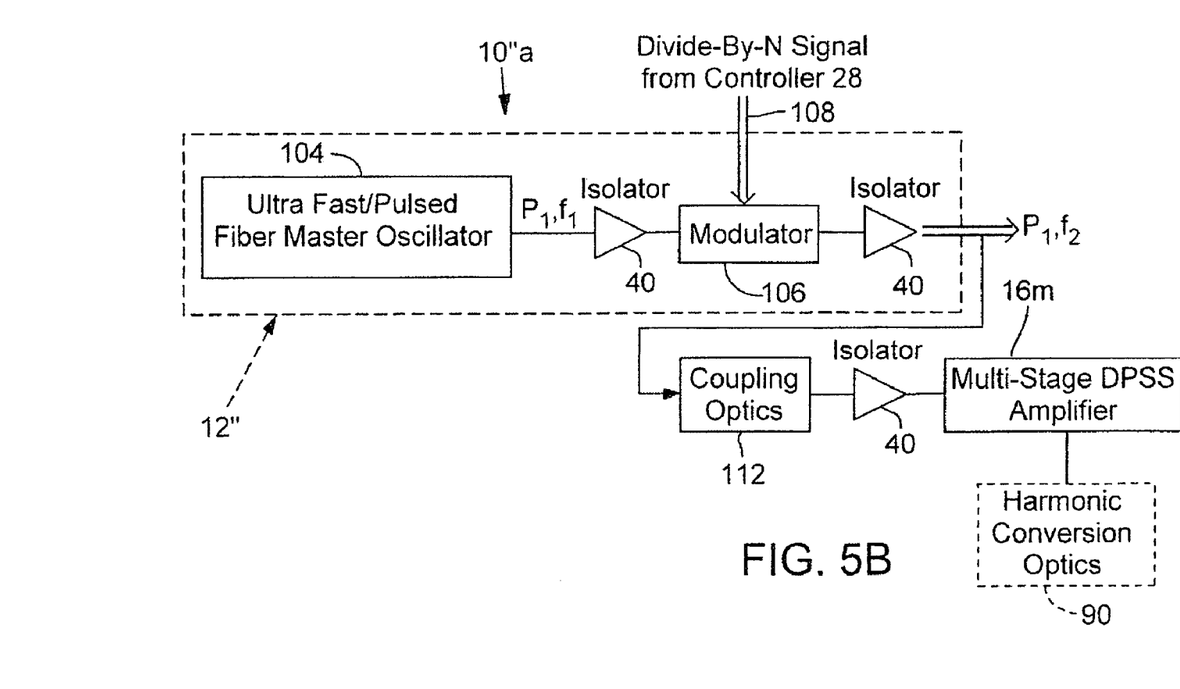
FIG. 5B shows as an alternative embodiment a tandem photonic amplifier that couples the output of the dynamic laser pulse shaper of FIG. 5A to a multi-stage DPSS amplifier to form a pulse-picked ultrafast tandem photonic amplifier.

FIG. 5B shows as an alternative embodiment a tandem photonic amplifier 10"a, in which narrow spectrum fiber power amplifier 110 is removed and a multi-stage DPSS amplifier 16m is substituted for DPSS amplifier 16 of tandem photonic amplifier 10" shown in FIG. 5A. This configuration results in a pulse-picked ultrafast tandem photonic amplifier, in which output from ultrafast dynamic laser pulse shaper 12" is coupled into multi-stage DPSS amplifier 16m, the output of which is subsequently applied to harmonic conversion optics module 90. In a first embodiment, multi-stage DPSS amplifier 16m includes two single-pass, end-pumped Nd:YVO$_4$ amplifiers, such as two DPSS-PA 16a or DPSS-PA 16b. In a second embodiment, multi-stage amplifier 16m includes two multi-pass, end-pumped Nd:YVO$_4$ amplifiers, such as two DPSS-PA 16f. Skilled persons will appreciate that, in the alternative, side-pumped Nd:YVO$_4$ amplifiers may be employed, and another solid state gain medium, such as Nd:YAG, Nd:YLF, Nd:YVO$_4$, Nd:GdVO$_4$, Nd:YAP, or Nd:LuVO$_4$, may be employed.

FIG. 6 shows a tandem photonic amplifier 10''', which differs from tandem photonic amplifier 10" in that pulsed fiber amplifier output is applied to a DPSS-PA 16''' that incorporates frequency selecting elements 120 such as Bragg fiber gratings or frequency stabilized seed oscillators selected or adjusted to produce desirable spectral output characteristics. A frequency locking element 120 is incorporated into DPSS-PA 16''' to provide feedback to narrow spectrum fiber power amplifier 110 to assist in frequency locking its output spectrum to the gain spectrum of the gain medium of DPSS-PA 16'''. The use of feedback causes multiple passes of the input tailored pulse through the gain medium of DPSS-PA 16'''.

Figure 7A:
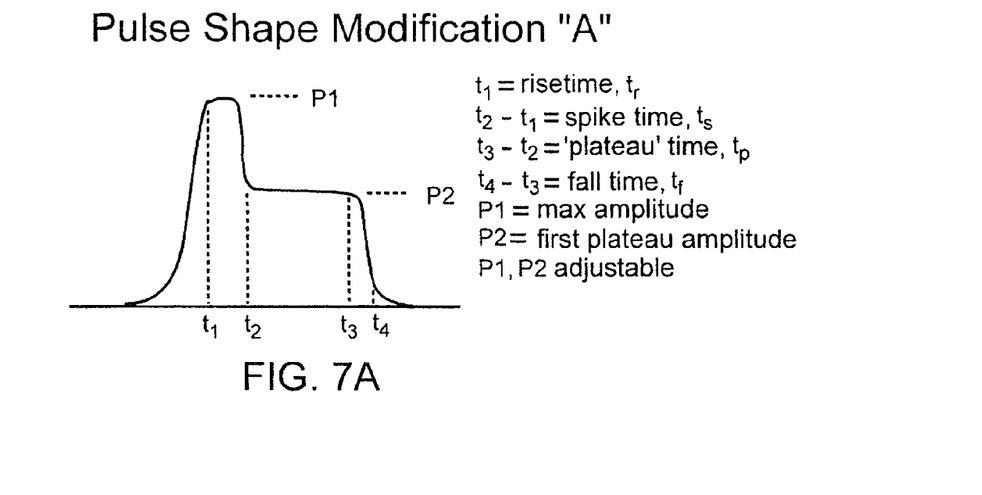
FIGS. 7A and 7B show exemplary temporal pulse shapes producible at the output of the diode-pumped solid state power amplifier of FIG. 2.
Figure 7B:
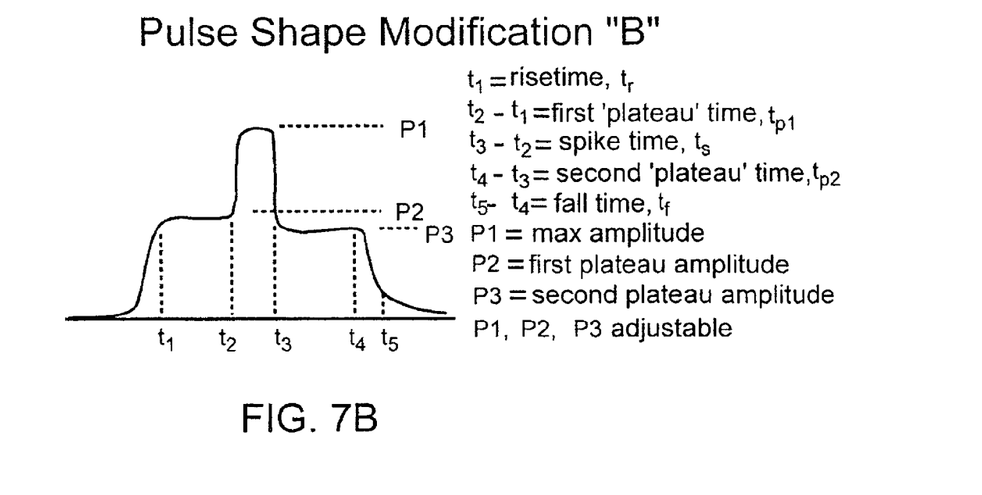

FIGS. 7A and 7B show exemplary temporal pulse shapes that may be produced at the output of DPSS-PA 16. In a preferred embodiment, the temporal pulse shapes shown in FIGS. 7A and 7B are produced by a laser pulse shaper of the type described above through employment of the appropriate modulation of the pulse shape input to a power amplifier such as, for example, FPA 14. Modulation methods may include diode pump modulation or external modulation of the input to the power amplifier by acousto-optic or electro-optic modulators. Modulation of the pump power supplied to the power amplifier may also be employed to further modify the temporal pulse shape produced by the laser subsystem.

Figures 8, 9:
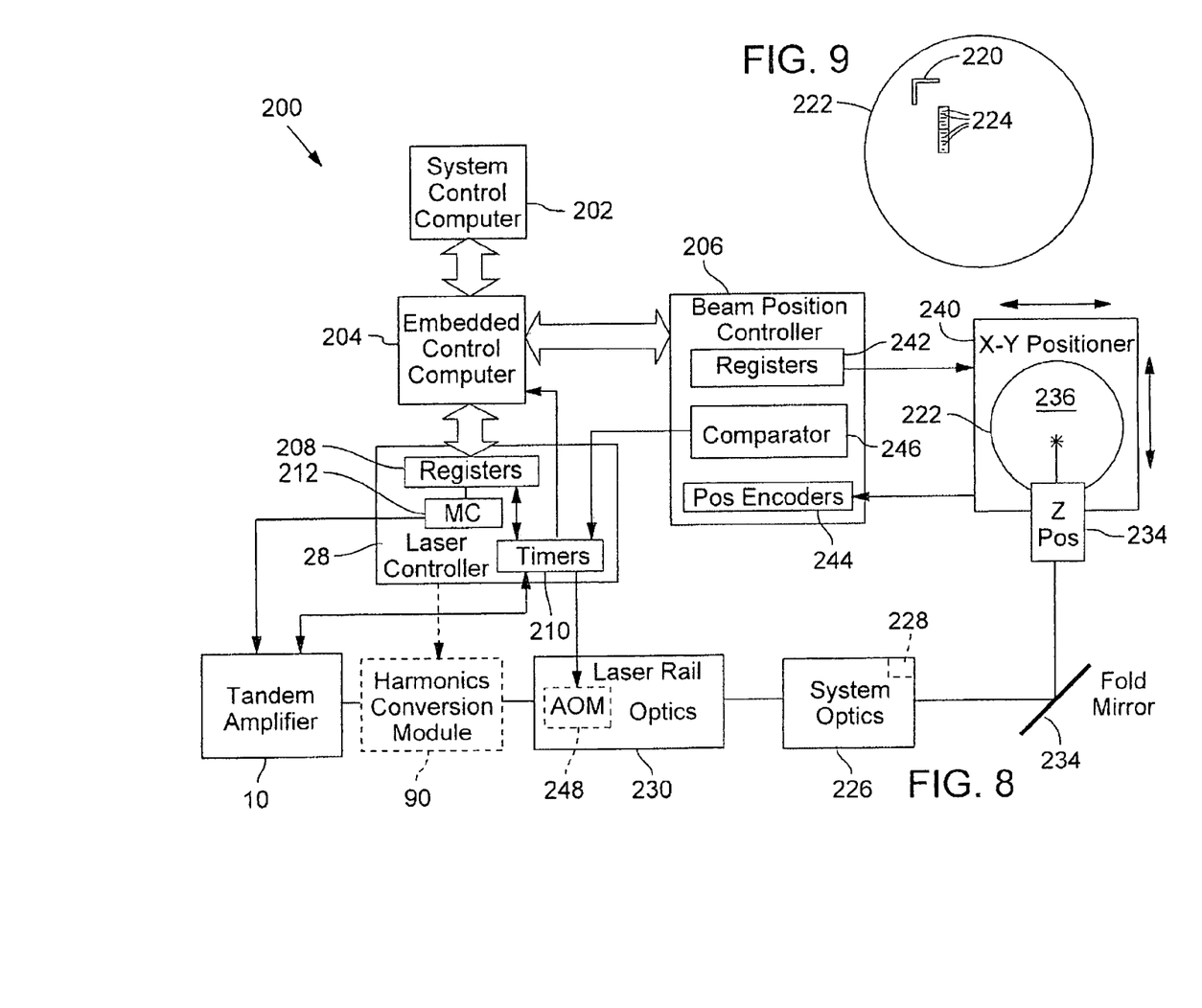
FIG. 8 shows a laser processing system in which the tandem photonic amplifier of FIG. 1 is employed.
FIG. 9 is a diagram showing a semiconductor wafer having on its work surface a target alignment workpiece feature and semiconductor link structures.

As shown in FIG. 8, tandem photonic amplifier 10 may be advantageously employed as the laser source for a laser processing system 200. A system control computer 202 provides to an embedded control computer (ECC) 204 overall system operational commands to which tandem amplifier controller 28 and a beam position controller (BPC) 206 respond. Tandem photonic amplifier 10 is controlled by tandem amplifier controller 28, which includes command and data registers 208 and timers 210 that directly or indirectly communicate with ECC 204 and BPC 206.

Controller 28 receives commands from embedded control computer (ECC) 204 and signals from beam position controller (BPC) 206 and provides commands to tandem photonic amplifier 10 for pulse emission (through external trigger commands) and pulse shape control. In a preferred embodiment, controller 28 receives commands from ECC 204 and in response issues from a modulator controller 212 external trigger commands to tandem photonic amplifier 10 in coordination with BPC 206 based on workpiece feature position data. Modulator controller 212 controls the times of emission and shapes of pulses emitted by tandem photonic amplifier 10. Alternatively, tandem photonic amplifier 10 emits pulses with interpulse time that is communicated to controller 28, ECC 204, or both. In a preferred embodiment, depending on the type of workpiece feature on which the emitted laser pulse will be incident, tandem photonic amplifier 10 is commanded by ECC 204 to produce a specific temporal pulse profile.

Illustrative examples of useful temporal profiles are shown in FIGS. 7A and 7B. For example, for scanning a target alignment workpiece feature 220 on a wafer specimen 222, shown in FIG. 9, a comparably much lower peak power and energy per pulse may be beneficial, so as not to damage the feature. Semiconductor memory link structures 224 might be most advantageously processed using a higher peak power and higher energy per pulse.

As those skilled in the art will appreciate, a wide range of preferred peak powers, energy amounts per pulse, and temporal energy profiles may be attractive for laser processing of semiconductor and other types of workpieces. Therefore, a method and an apparatus for allowing a user of a laser processing system to program the temporal profile to be employed for a specific class of workpieces that may be encountered on a wafer or wafers is highly desirable.

Such a method and an apparatus include instrumentation for satisfactory measurement and calibration of the range of pertinent laser process parameters, such as temporal profile, energy per pulse, and focused beam propagation attributes. As shown in FIG. 8, system optics 226 may preferably include a photodetection module 228, which may be employed for the detection of incident laser output and of laser output reflected from the work surface. Photodetection module 228 preferably incorporates a photodetector circuit capable of fine digitization of the detected light signals, such as the incident and reflected laser output signals, thereby allowing for the incident and reflected pulse waveforms to be effectively digitized. This method and apparatus allow for satisfactory measurement of the incident and reflected laser waveforms, allowing calculation and calibration of the temporal profile, temporal profile variation, pulse amplitude stability, pulse energy stability, and the energy per pulse. As those skilled in the art will recognize, scanning the laser beam across a target area of sharply varying reflectivity at the laser wavelength can then provide a method for measurement and calculation of the focused spot size attributes of the laser beam.

In a preferred embodiment of laser processing system 200 employing tandem photonic amplifier 10, as shown in FIG. 8, tandem amplifier output is applied to laser rail optics 230 and system optics 226. Output from system optics 226 is directed by a fold mirror 232 toward a Z-positioning mechanism 234, which may incorporate a lens assembly, for subsequent delivery to a work surface 236 of target specimen 222 for laser processing of workpiece features (e.g., target alignment feature 220 and memory link structure 224). BPC 206 provides X-Y coordinate positioning signals to direct an X-Y positioning mechanism 240 to a location where the output from Z-positioning mechanism 234 can process a desired target feature. X-Y positioning mechanism 240 receives command position signals from registers 242 of BCP 206 and directs actual position signals to position encoders 244 of BCP 206, which includes a comparator module 246 that determines a position difference value and sends it to timers 210. Timers 210 respond by sending a trigger signal appropriately timed to operate in laser rail optics 230 an acousto-optic modulator 248 that modulates the output from tandem photonic amplifier 10. Those skilled in the art will recognize that the pulse output from tandem photonic amplifier 10 may be directed into harmonic conversion module 90 and subsequently delivered by way of laser rail optics 230 and system optics 226 to work surface 236 for harmonic laser processing of workpiece features.

Those skilled in the art will recognize that alternative arrangements of laser processing system elements may be employed and a wide variety of workpieces may be processed by a laser processing system employing tandem photonic amplifier 10.

It will be obvious to those having skill in the art that many changes may be made to the details of the above-described embodiments without departing from the underlying principles of the invention. The scope of the present invention should, therefore, be determined only by the following claims.

The invention claimed is:

1. A tandem photonic amplifier, comprising:
a tandem amplifier controller;
a dynamic laser pulse shaping generator emitting tailored pulse spectral output in response to the tandem amplifier controller, the laser pulse shaping generator including a pulsed optical fiber-based laser source configured to produce at an operating pulse repetition frequency the tailored pulse spectral output at a first peak power, a first pulse energy, and a tailored temporal pulse profile;
a solid state photonics amplifier operatively associated with the laser pulse shaping generator and having an emission wavelength; and
a frequency selective device operatively associated with the pulsed optical fiber-based laser source and the solid state photonics amplifier to effectively couple the tailored pulse spectral output to the emission wavelength of the solid state photonics amplifier, and to thereby enable the solid state photonics amplifier to produce an amplified laser output characterized by substantially faithful replication of the tailored temporal pulse profile of the tailored pulse spectral output at a second peak power and a second pulse energy that are greater than, respectively, the first peak power and the second pulse energy.

2. The tandem photonic amplifier of claim 1, in which pulsed optical fiber-based laser source includes a laser oscillator that is optically coupled to an optical fiber power amplifier to produce the pulsed laser output.

3. The tandem photonic amplifier of claim 2, in which the laser oscillator includes one or more diode lasers.

4. The tandem photonic amplifier of claim 1, in which the pulsed optical fiber-based laser source includes an optical fiber power amplifier having an output that provides the pulsed laser output with a tailored temporal pulse profile, the optical fiber power amplifier including a power amplifier gain fiber.

5. The tandem photonic amplifier of claim 4, in which the power amplifier gain fiber is of a large mode area fiber type.

6. The tandem photonic amplifier of claim 4, in which the power amplifier gain fiber includes one or more dopants selected from the group consisting of Nd, Yb, Ho, Er, Dy, Pr, Tm, and Cr.

7. The tandem photonic amplifier of claim 4, in which the power amplifier gain fiber is of a multi-mode fiber type.

8. The tandem photonic amplifier of claim 4, in which the optical ber power amplifier includes a photonic crystal fiber amplifier stage.

9. The tandem photonic amplifier of claim 4, in which the optical fiber power amplifier includes multiple photonic crystal fiber amplifier stages.

10. The tandem photonic amplifier of claim 1, in which the solid state photonics amplifier includes a diode-pumped solid state power amplifier.

11. The tandem photonic amplifier of claim 10, in which the diode-pumped solid state power amplifier includes a gain element that is side pumped by one or more diode pump elements.

12. The tandem photonic amplifier of claim 10, in which the diode-pumped solid state power amplifier includes a gain element that is end pumped by one or more diode pump elements.

13. The tandem photonic amplifier of claim 10, in which the diode-pumped solid state power amplifier includes multiple gain elements, each of which is side pumped by one or more different diode-pumped elements.

14. The tandem photonic amplifier of claim 10, in which the diode-pumped solid state power amplifier includes multiple gain elements, each of which is end pumped by one or more diode-pumped elements.

15. The tandem photonic amplifier of claim 10, in which the diode-pumped solid state power amplifier includes multiple-pass, end-pumped gain elements.

16. The tandem photonic amplifier of claim 10, in which the diode-pumped solid state power amplifier includes multiple-pass, side-pumped gain elements.

17. The tandem photonic amplifier of claim 1, in which the pulsed optical fiber-based laser source includes a diode-pumped fiber master oscillator emitting the pulsed laser output having a pulse width of between about 1 fs and about 500 ps at a wavelength of between of about 100 nm and about 2.2 µm.

18. The tandem photonic amplifier of claim 1, in which the pulsed optical fiber-based laser source includes a fiber laser master oscillator optically associated with a fiber power amplifier emitting the pulsed laser output having a pulse width of between about 1 fs and about 100 ps at a wavelength of between about 100 nm and about 2.2 µm.

19. The tandem photonic amplifier of claim 1, in which the pulsed optical fiber-based laser source includes a fiber laser master oscillator.

20. The tandem photonic amplifier of claim 1, in which the dynamic laser pulse shaping generator comprises:
   a master oscillator that includes at least one modulator-amplifier stage to generate a master oscillator tailored pulse output at a pulse energy, a pulse peak power, and a tailored pulse temporal profile at a first center wavelength; and
   an optically pumped fiber power amplifier that produces in response to the master oscillator tailored pulse output a fiber power amplifier tailored pulse output at a pulse energy, a pulse peak power, and a tailored pulse temporal profile that is at the first center wavelength and is substantially equivalent to the tailored pulse temporal profile of the master oscillator tailored pulse output.

21. The tandem photonic amplifier of claim 20, in which the solid state photonics amplifier includes a solid state gain medium that is selected from the group consisting of Nd:YVO$_4$, Nd:YAG, Nd:YLF, Nd:YAP, Nd:Glass, Nd:LuVO$_4$, and Nd:GdVO$_4$.

22. The tandem photonic amplifier of claim 1, in which the amplified laser output characterized by the substantially faithful replication of the tailored temporal pulse profile is produced at a first center wavelength, and further comprising an optical harmonic converter optically associated with the solid state photonics amplifier to convert the first center wavelength and produce a harmonic converter output at a second center wavelength that is shorter than the first center wavelength.

23. The tandem photonic amplifier of claim 22, in which the production of the harmonic converter output results in a peak power that is different from the second peak power of the replication of the tailored pulse temporal profile of the amplified laser output.

24. The tandem photonic amplifier of claim 1, in which the pulsed optical fiber-based laser source comprises multiple stages of diode-pumped fiber amplification to form the tailored pulse spectral output.

25. The tandem photonic amplifier of claim 24, in which the multiple stages of diode-pumped fiber amplification include first and second diode-pumped amplifying fibers, the first diode-pumped amplifying fiber producing a first output pulse shape that is coupled into the second diode-pumped amplifying fiber to form the tailored pulse spectral output.

26. The tandem photonic amplifier of claim 1, in which the pulsed optical fiber-based laser source is optically associated with multiple stages of diode-pumped solid state amplification to form the tailored pulse spectral output.

27. The tandem photonic amplifier of claim 1, in which the solid state photonics amplifier has a gain spectrum, and in which the pulsed optical fiber-based laser source comprises a diode laser having an output wavelength and a fiber power amplifier having a gain spectrum, the output wavelength of the diode laser being closely matched to the gain spectra of the fiber power amplifier and the solid state photonics amplifier.

28. The tandem photonic amplifier of claim 27, in which the diode laser is of a continuous-wave type and is optically coupled to an optical modulator that modulates the output of the continuous-wave diode laser.

29. The tandem photonic amplifier of claim 27, in which the diode laser is of a pulsed type.

30. The tandem photonic amplifier of claim 1, in which the pulsed optical fiber-based laser source includes a power amplifier gain fiber of a photonic crystal fiber type.

31. The tandem photonic amplifier of claim 1, in which the solid state photonics amplifier receives an input tailored pulse derived from the tailored pulse spectral output, and further comprises a gain medium optically coupled to the frequency selective device to cause multiple passes of the input tailored pulse through the gain medium.

32. The tandem photonic amplifier of claim 1, comprising a subsystem of a laser processing system that directs processing laser output corresponding to the amplified laser output to process a workpiece feature of a target specimen and includes:
   a laser beam position controller providing command positioning signals to a beam positioning mechanism on which the processing laser output is incident; and
   a system control computer providing operational commands to which the tandem amplifier controller and the laser beam position controller respond such that the processing laser output of a desired temporal pulse profile is directed to a location of a desired workpiece feature of the target specimen.

33. The tandem photonic amplifier of claim 32, in which the processing of a workpiece feature includes semiconductor workpiece micromachining.

34. The tandem photonic amplifier of claim 33, in which the semiconductor workpiece micromachining includes semiconductor link processing.

* * * * *